United States Patent
Hewitt et al.

(10) Patent No.: US 10,587,117 B2
(45) Date of Patent: Mar. 10, 2020

(54) DISABLING SOCKETS IN A POWER DISTRIBUTION UNIT IN RESPONSE TO DETECTION OF EXCESS POWER

(71) Applicant: International Business Machines Corporation, Armonk, NY (US)

(72) Inventors: James Hewitt, Hampshire (GB); Colin I. Holyoake, Hampshire (GB); Richard Postlethwaite, Hampshire (GB); Caroline J. Thomas, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 15/438,830

(22) Filed: Feb. 22, 2017

(65) Prior Publication Data
US 2018/0241206 A1 Aug. 23, 2018

(51) Int. Cl.
*H02J 3/00* (2006.01)
*H02J 1/14* (2006.01)
(Continued)

(52) U.S. Cl.
CPC .............. *H02J 1/14* (2013.01); *H01R 13/447* (2013.01); *H02J 3/14* (2013.01); *H01R 24/78* (2013.01);
(Continued)

(58) Field of Classification Search
CPC .......... H02J 3/00; H02J 13/00; H01R 13/447; H01R 25/003; H01R 24/78; H01R 2103/00
See application file for complete search history.

(56) References Cited

U.S. PATENT DOCUMENTS 6,295,003 B1  9/2001 Wu
7,455,538 B2 * 11/2008 Germain ............ H01R 13/4534
                                                            439/137
(Continued)

OTHER PUBLICATIONS

Office Action (dated Jan. 28, 2019) for U.S. Appl. No. 15/627,574, filed Jun. 20, 2017.
(Continued)

*Primary Examiner* — Jared Fureman
*Assistant Examiner* — Michael J Warmflash
(74) *Attorney, Agent, or Firm* — Schmeiser, Olsen & Watts, LLP; William Hartwell (57) ABSTRACT

An electrical power distribution unit for overload prevention and a method for preventing overload of the electrical power distribution unit. The power distribution unit includes: (i) a plurality of sockets, each socket being an electrical power outlet socket, each socket having a plurality of receptacles for receiving corresponding pins of a power plug; (ii) a mechanical disabling mechanism configured to disable each socket that is unoccupied by a respective power plug; and (iii) an excess power detector configured to detect an aggregate power drawn from the sockets. The method includes: monitoring, by the excess power detector, a first aggregate power drawn from the sockets; and determining that the first aggregate power exceeds a predetermined first threshold and in response, actuating the mechanical disabling mechanism to disable each socket that is unoccupied by a respective power plug.

19 Claims, 7 Drawing Sheets

(51) Int. Cl.
*H01R 13/447* (2006.01)
*H02J 3/14* (2006.01)
*H01R 24/78* (2011.01)
*H01R 103/00* (2006.01)
*H01R 25/00* (2006.01)

(52) U.S. Cl.
CPC ........ *H01R 25/003* (2013.01); *H01R 2103/00* (2013.01)

(56) References Cited

U.S. PATENT DOCUMENTS

| | | | |
|---|---|---|---|
| 9,564,718 B2* | 2/2017 | Li | H01R 24/78 |
| 10,003,163 B2* | 6/2018 | Hewitt | H01L 45/1608 |
| 2007/0054520 A1 | 3/2007 | Wu | |
| 2007/0096932 A1 | 5/2007 | Lai | |
| 2009/0040056 A1 | 2/2009 | Yang | |
| 2009/0282274 A1 | 11/2009 | Langgood et al. | |
| 2011/0190953 A1* | 8/2011 | Park | G05B 15/02 700/291 |
| 2011/0270458 A1 | 11/2011 | Liu | |
| 2015/0130276 A1* | 5/2015 | McNeill-McCallum | H02J 3/00 307/23 |
| 2015/0333503 A1 | 11/2015 | Bermingham et al. | |
| 2015/0340795 A1* | 11/2015 | Lee | G06F 1/1656 381/334 |
| 2016/0036162 A1* | 2/2016 | Ohler | H01R 13/633 439/159 |
| 2017/0125984 A1* | 5/2017 | Mergener | H02B 1/52 |
| 2017/0345600 A1 | 11/2017 | Naumann et al. | |
| 2018/0366885 A1 | 12/2018 | Hewitt et al. | |

OTHER PUBLICATIONS

Tan et al., Power Socket Programmable Circuit Breaker System, Published in: Power and Energy Conference, 2008. PECon 2008. IEEE 2nd International,Date of Conference: Dec. 1-3, 2008, Date Added to IEEE Explore: Jan. 27, 2009, URL: http://ieeexplore.ieee.org/document/4762531/, pp. 574-577.

* cited by examiner

DISABLING SOCKETS IN A POWER DISTRIBUTION UNIT IN RESPONSE TO DETECTION OF EXCESS POWER

TECHNICAL FIELD

The present invention relates to a power distribution unit, and more specifically, to a power distribution unit having an overload prevention system.

BACKGROUND

Power distribution units provide an input source of power to multiple socket outlets, which enable a single source of power to feed to multiple electrical appliances.

In a domestic electricity environment, a power distribution unit may be an extension lead with a housing for multiple sockets, which is plugged into a wall socket for power supply. Similar power distribution units may be used in industrial environments plugged into a wall socket or supplied by an industrial power supply, such as a generator.

In a data center environment, power distribution units may be provided within the data center providing multiple power sockets often in the form of power poles. The power poles may have supplied power sources from a commercial power point.

SUMMARY

Embodiments of the present invention provide an electrical power distribution unit for overload prevention, including: (i) a plurality of sockets, each socket being an electrical power outlet sockets, each socket having a plurality of receptacles for receiving corresponding pins of a power plug, and at least one of the sockets being selectively disabled by a mechanical disabling mechanism; (ii) a mechanical disabling mechanism configured to disable each socket that is unoccupied by a respective power plug; and (iii) an excess power detector for configured to detecting an aggregate power drawn from the sockets and configured to actuating the mechanical disabling mechanism for the or disabling each of the power outlet sockets that is unoccupied by a power plug in response to a determination that the detected aggregate power exceeding a predetermined first threshold.

Embodiments of the present invention provide a method, and an associated computer program product, for preventing overload of the electrical power distribution unit. The method includes: monitoring, by the excess power detector, a first aggregate power drawn from the sockets; and determining that the first aggregate power exceeds a predetermined first threshold and in response, actuating the mechanical disabling mechanism to disable each socket that is unoccupied by a respective power plug.

BRIEF DESCRIPTION OF THE DRAWINGS

Embodiments of the present invention will now be described, by way of example only, with reference to the following drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

It is easy to overload a wall socket or commercial power point when using a power distribution unit, whether the wall socket or commercial power point is located within a domestic property, industrial environment, or a data center environment.

For example in a home environment, an extension lead with a circuit designed for 13 Amps may be plugged into a wall socket. The extension lead may have 10 sockets supplying 10 devices all running at 3 Amps. Another extension lead may be plugged into one of the 10 sockets providing two extension leads in series. The devices may be running at a total of 32 Amps, which is less than a house ring mains fuse trip; however, but is not in compliance with the 13 Amp extension socket designed cabling.

Thus, there is a high risk of fire by overloading a plug socket and/or cabling within the extension lead. The wire of the extension lead may become warm eventually creating a fire.

The prior art includes circuit breakers and fuses which are designed to stop the electricity supply if the electrical load is greater than the circuit breaker or fuse allowance. However, the circuit breaker or fuse does not always activate at the maximum load and can survive with gradual load increases.

In addition, there are known power distribution units, which monitor and provide warnings of potential power overloads. The warning may provide an alert to take preventive action. These units have the disadvantage of requiring monitoring and a need for alerts to be correctly set up. Ignoring such alerts provides a continued risk.

Electrical power distribution units provide multiple outputs in the form of sockets for power plugs in order to distribute electric power from a single source. Power distribution units may be provided for a domestic environment or for a commercial data center environment, as well as other industrial applications.

Figure 1A:
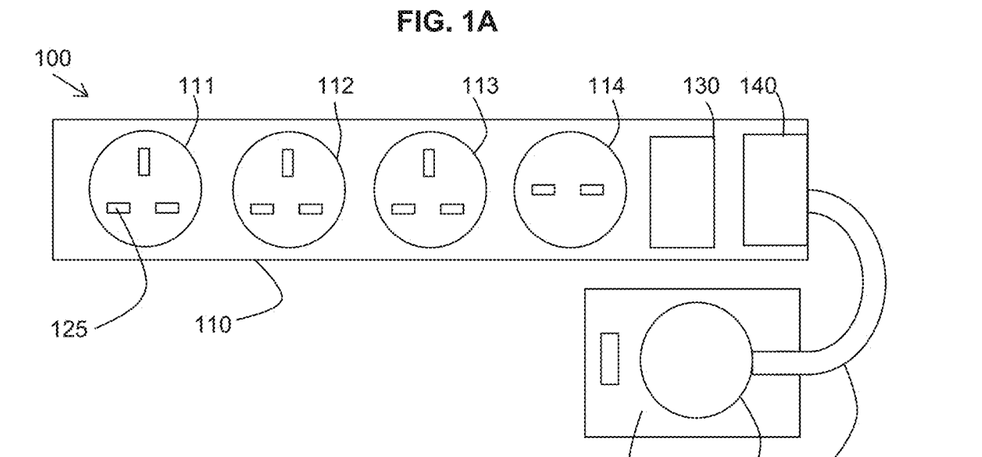
FIGS. 1A and 1B are example embodiments of power distribution units in which the present invention may be implemented.
Figure 1B:
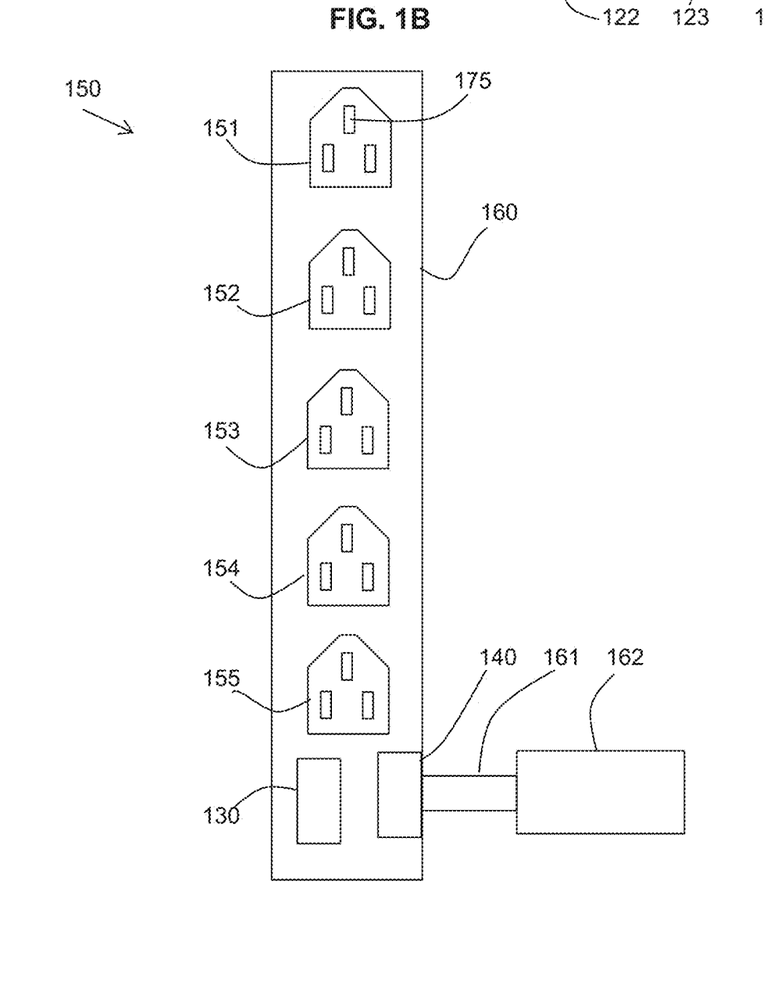

FIGS. 1A and 1B are example embodiments of power distribution units in which the present invention may be implemented. More specifically, FIGS. 1A and 1B are schematic diagrams which show example embodiments of two types of power distribution units 100, 150 in which the described overload prevention system may be implemented.

FIG. 1A shows a power distribution unit 100 for a domestic environment in the form of an electrical adapter for increasing the number of sockets available from a mains electricity wall socket.

The power distribution unit 100 includes a housing 110, which in this example is shown as an elongate housing. Other forms of housing may be provided such as a square configuration, a circular wheel-like configuration, etc. The housing 110 provides multiple sockets 111-114 for receiving electric plugs (not shown) of, inter cilia, appliances. Each socket of sockets 111-115 includes three receptacles 125, or a plurality of receptacles generally. The sockets 111-114 may take different forms to accommodate different formats of electric plug. For example, sockets may be provided for an earthed three-pin plug and/or two-pin unearthed plugs for double-insulated appliances. Sockets 111-114 may also take varying forms depending on the standard of a country or region.

The housing 110 may accommodate the internal support and wiring of the sockets 111-114 as fed from an external power source. The external power source may be provided from a mains wall socket 122 fed from a domestic mains electricity supply. A plug 123 may be attached to an input cable 121 feeding to the internal support and wiring of the sockets 111-114.

A fuse may be provided by the power distribution unit 100 between the external power supply and the sockets 111-114 to disable the power distribution unit 100 if too much current is drawn from the sockets 111-114.

FIG. 1B shows a power distribution unit 150 for a data center environment in the form of power pole or rack providing multiple sockets 151-155 supplied from a commercial power supply 162 which may have an input cable 161 to the power distribution unit 150. Each socket of sockets 151-155 includes three receptacles 175, or a plurality of receptacles generally. The power distribution unit 150 may be for direct current (DC) appliances or alternating current (AC) appliances.

The power distribution unit 150 includes a housing 160, which in this example is shown as an elongate vertical housing. The housing 160 provides multiple sockets 151-155 for receiving electric plugs (not shown) of appliances. Common appliances in a data center may include servers, storage area networks (SANs), network switches, etc. The sockets 151-155 may take different forms to accommodate different formats of electric plug; however, a cot non socket for a commercial data center may be a C13 socket for a C14 plug as defined by International Electrotechnical Commission (IEC) specification IEC 60320.

The housing 160 may accommodate the internal support and wiring of the sockets 151-155 as fed by the input cable 161 from the power supply 162.

A fuse or circuit breaker (not shown in FIG. 2) may be provided by the power distribution unit 150 between the power supply 162 and the sockets 151-155 to disable the power distribution unit 150 if too much current is drawn from the sockets 151-155.

In environments that include the power distribution units 100, 150, an aggregate current ammeter 140 may be included to measure the aggregate current being drawn by the sockets 111-114, 151-155 and, optionally, an alert generator (not shown in FIG. 2) may be included for generating an alert if the drawn power reaches an unacceptable high level, before a fuse in the power distribution unit 100, 150 is blown.

In one embodiment, the power distribution units 100, 150 include an overload prevention system 130 that is described in more detail below. The overload prevention system 130 controls the disabling of one or more sockets 111-114, 151-155 which are not currently in use when an aggregate current drawn by the in use sockets 111-114, 151-155 reaches a predetermined first threshold close to the maximum capacity of the power distribution unit 100, 150 or associated components.

The overload prevention system 130 detects an aggregate power drawn from the sockets, for example, using an ammeter 140 at the power input to the power distribution unit 100, 150, and actuates a mechanical disabling mechanism for each power outlet socket that is unoccupied in response to the detected aggregate power exceeding the predetermined first threshold.

Figure 2:
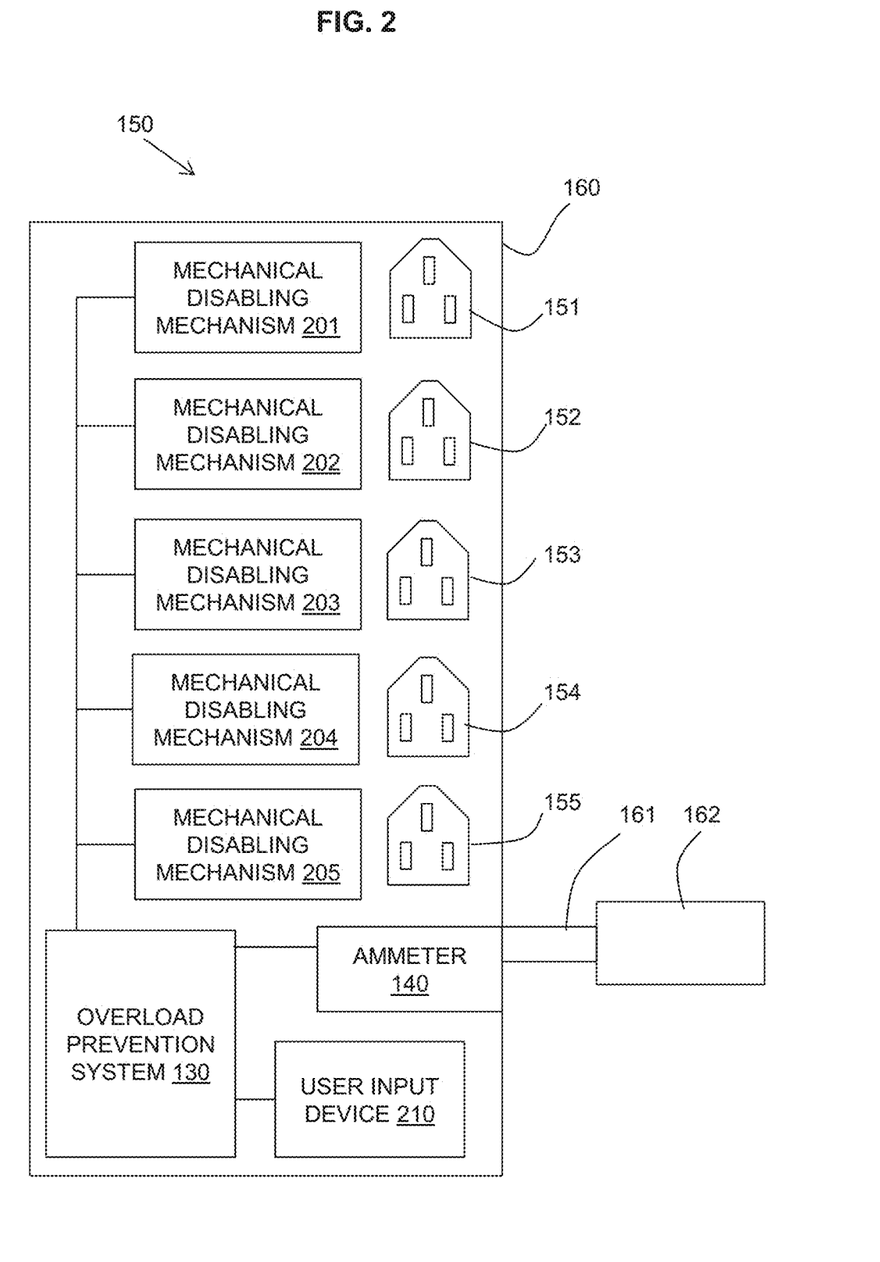
FIG. 2 is a schematic diagram of an example embodiment of a power distribution unit, in accordance with embodiments of the present invention.

FIG. 2 is a schematic diagram of an example embodiment of a power distribution unit, in accordance with embodiments of the present invention. In particular, an embodiment of a power distribution unit 150 having the described overload prevention system 130 is shown in FIG. 2. This embodiment is shown with reference to the power distribution unit 150 of FIG. 1B, but may alternatively be provided with respect to the power distribution unit 100 of FIG. 1A.

Referring to FIG. 2 the mechanical disabling mechanism is provided in the form of a physical barrier that may prevent insertion of a plug into a socket.

In response to the aggregate current reaching a first threshold, the overload prevention system 130 may actuate the disabling mechanism in the form of mechanical disabling mechanisms 201-205 provided at each of the sockets 151-155, respectively.

The physical barrier may be a selectively occludable shutter for occluding one or more of the socket receptacles. The occludable shutter may be electrically actuable; for example, by use of a solenoid.

When a coil of a solenoid is energized, the resulting electromotive force attracts an armature rod into the armature opening and keeps a shutter in an open position. However, when the coil of the solenoid is not energized, the armature rod may extend from the armature opening, for example, due to the biasing of a compression spring, pushing the shutter to occlude one or more socket receptacles.

The overload prevention system 130 may actuate the mechanical disabling mechanisms 201-205 of all of the sockets 151-155; however, only sockets which do not currently have an inserted plug will be disabled. The shutter will only be able to move to occlude one or more of the socket receptacles if no plug is present in the socket so that nothing prevents the shutter from moving to occlude the receptacle.

The mechanical disabling mechanism may therefore provide a means of preventing any additional plugs from being inserted into any empty sockets thereby preventing additional drawing of current that would overload the power distribution unit 150.

The overload prevention system 130 may also include control of a re-enabling mechanism which may de-actuate the mechanical disabling mechanisms when the aggregated current drawn by the power distribution unit falls below a second threshold at which it is deemed safe to allow further plugs to be inserted to draw additional current.

Additionally, an override system may be provided with a user input device 210 provided in the housing 160 of the power distribution unit 150, which may override the overload prevention system 130 and prevent actuation or de-actuate the mechanical disabling mechanism. The user input device 210 may be a manual override such as a switch.

Figure 3A:
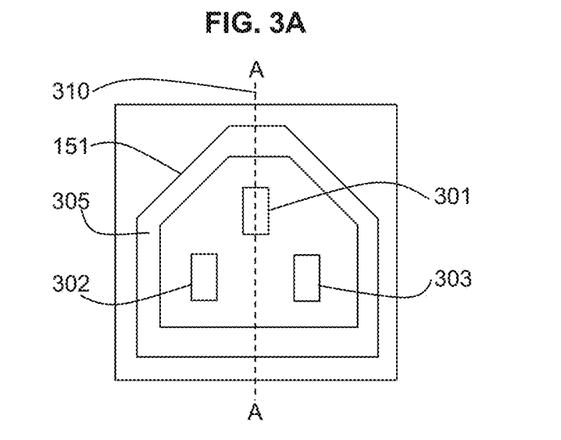
FIG. 3A is a front view of a socket with a vertical line A-A of an example embodiment of a disabling mechanism, in accordance with embodiments of the present invention.
Figure 3B:
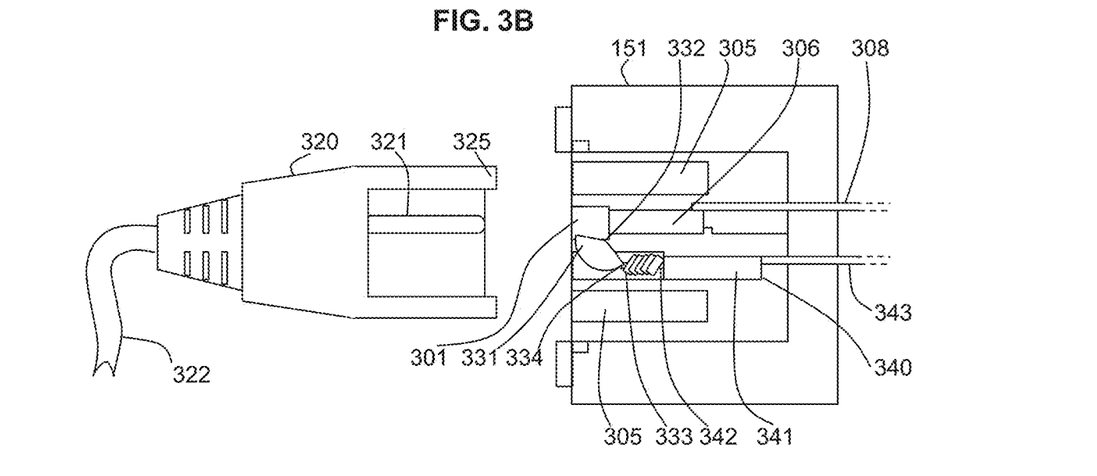
FIGS. 3B and 3C depict a cross-sectional view of the socket of FIG. 3A through line A-A showing the disabling mechanism in an un-actuated position (FIG. 3B) and in an actuated position (FIG. 3C).
Figure 3C:
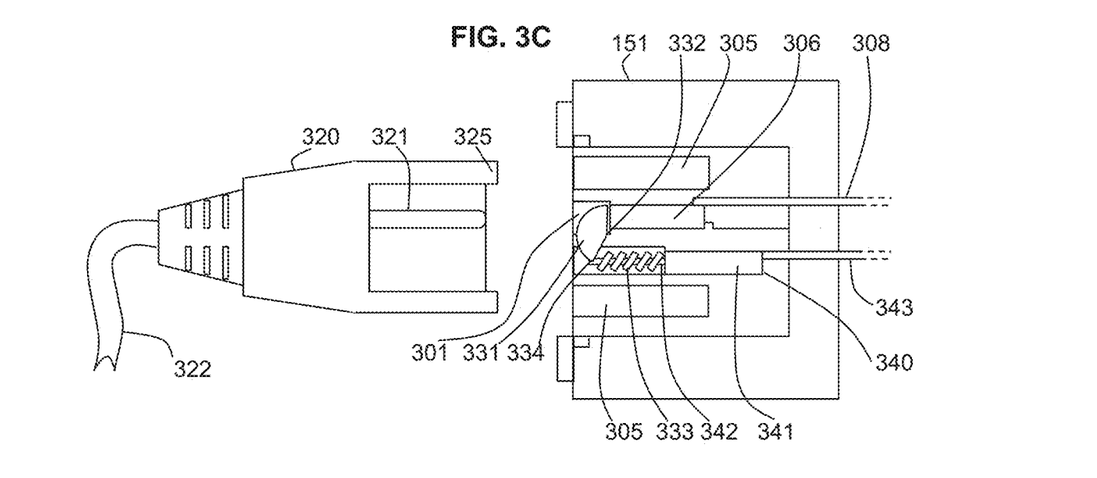

FIGS. 3A, 3B and 3C illustrate an example embodiment of the mechanical disabling mechanism 201-205 which may be provided at each socket 151-155 of a power distribution unit 150.

FIG. 3A is a front view of a socket with a vertical line A-A of an example embodiment of a disabling mechanism, in accordance with embodiments of the present invention.

FIGS. 3B and 3C depict a cross-sectional view of the socket of FIG. 3A through line A-A showing the disabling mechanism in an un-actuated position (FIG. 3B) and in an actuated position (FIG. 3C).

FIG. 3A shows a front view of a socket 151 having plug skirt recess channel 305 and three slots 301-303 for receiving in use plug pins. FIG. 3A shows the vertical line A-A 310 through the slot 301 used for an earth pin of a plug through which cross-sectional views are shown in FIGS. 3B and 3C in un-actuated and actuated positions respectively.

FIGS. 3B and 3C illustrate a cross-sectional view through line A-A 310 of FIG. 3A, through the middle of the earth pin slot 301 of a standard C13 socket together with a cross-sectional view of a standard C14 plug 320. The plug 320 is shown with an integral cable 322, an earth pin 321 and a pair of main pins (not visible in section A-A), which are shrouded by a skirt 325.

In the socket 151, the earth pin slot 301 and the plug skirt recess channel 305 are visible as well as an earth connector blade-type contact 306 with which the earth plug pin 321 forms an electrical connection when inserted. The earth connector contact 306 is electrically connected to an earth cable 308.

In FIGS. 3B and 3C, the principal parts of the mechanical disabling mechanism are a rotatable shutter 331 rotatable around a pivot point 332, a compression spring 333, and a solenoid 340. The solenoid 340 comprises an electromagnetic coil 341 and an armature rod 342, wherein the coil 341 is energized by supplying electrical power through a power cable 343. The armature rod 342 is free to move axially relative to the coil 341 in and out of an armature opening at one end of the coil 341. The other end of the coil 341 is closed. The compression spring 333 is conveniently arranged so that the compression spring 333 is sleeved over the armature rod 342, e.g., axially concentric therewith.

In the socket 151, the earth pin slot 301 and the plug skirt recess channel 305 are visible as well as an earth connector blade-type contact 306 with which the earth plug pin 321 forms an electrical connection when inserted. The earth connector contact 306 is electrically connected to an earth cable 308.

The compression spring 333 is a helical coil spring and therefore has a cylindrical free space running along its principal axis. In this cylindrical free space there is fitted the armature rod 342, so that the compression spring 333 is sleeved over the armature rod 342.

The distal end of the armature rod 342 is connected or attached to an edge or corner of the rotatable shutter 331 at a connection point 334. A movement of the armature rod 342 from a retracted position within the solenoid's electromagnetic coil 341, at which point the compression spring 333 is compressed, (shown in FIG. 3B) to an extended position in which the armature rod 342 is extended from the solenoid's electromagnetic coil 341, at which point the compression spring 333 is relaxed (shown in FIG. 3C), which results in the armature rod 342 exerting a pressure on the rotatable shutter 331 to rotate the rotatable shutter 331 into the position occluding the earth pin slot 301. A movement of the armature rod 342 from the extended position (FIG. 3C) to the retracted position (FIG. 3B) results in the armature rod 342 pulling the rotatable shutter 331 by the connected edge or corner 334 of the rotatable shutter 331, to pivot the rotatable shutter 331 about the pivot point 332 of the rotatable shutter 331 to open the rotatable shutter 331 thereby opening the earth pin slot 301.

The rotational shutter 331 may be shaped as an obtuse-angled segment of a circle to provide a substantially straight line of travel for the armature rod 342 while creating a rotational movement of the rotational shutter 331. The armature rod 342 may be connected to a corner of the circle segment with rotation around the center of the circle of which the shutter 331 is a segment.

When the solenoid coil 341 is energized, the resulting electromotive force attracts the armature rod 342 into the armature opening (e.g., from left to right in FIG. 3B). Here it is noted that the electromotive force needs to be strong enough to overcome the biasing force of the compression spring 333 that is acting in the opposite direction.

When the solenoid coil 341 is not energized, the armature rod 342 is subject to no or minimal electromotive force from the coil 341. Since the force from the compression spring 333 is present, the armature rod 342 is biased into an extended position thereby closing the rotatable shutter 331.

Figure 4:
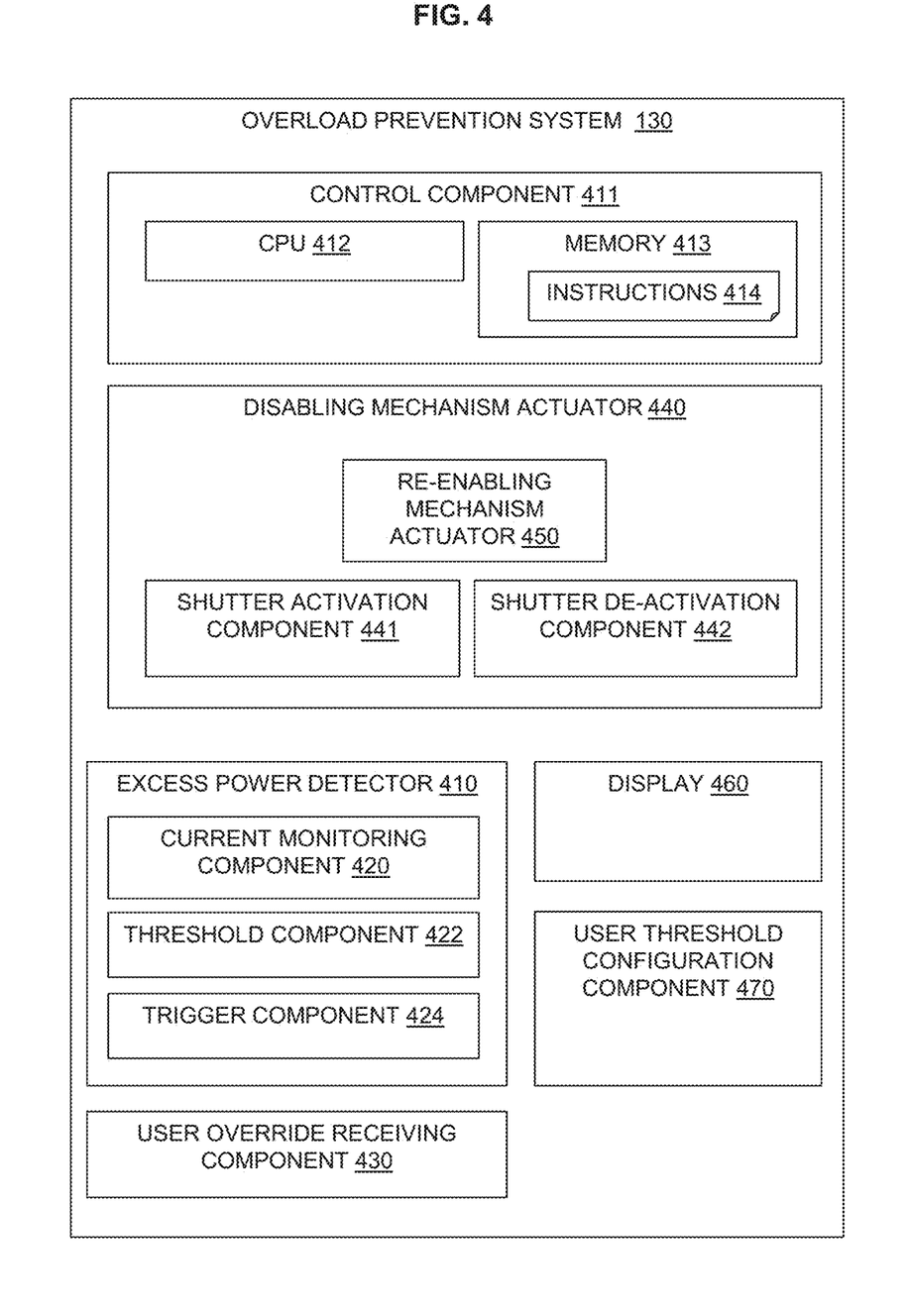
FIG. 4 is block diagram of an example embodiment of a system, in accordance with embodiments of the present invention.

FIG. 4 is block diagram of an example embodiment of a system, in accordance with embodiments of the present invention. More specifically, FIG. 4 is a block diagram that illustrates an example embodiment of the overload prevention system 130 as provided in power distribution units 100, 150. The overload prevention system 130 may be incorporated into the power distribution unit 100, 150.

The overload prevention system 130 may include a control component 411 that may be a central processing unit (CPU) 412 that executes instructions 414 provided in memory 413. The CPU may be implemented using a single integrated circuit (IC), a number of ICs, discrete transistors, or hardware modules. In one embodiment, the control component 411 may be used in the computer system 600 of FIG. 6.

The overload prevention system 130 may include an excess power detector 410 which may include a current monitoring component 420 which may receive aggregated current values as determined by an ammeter measuring the current drawn by the combined sockets of the power distribution unit.

The excess power detector 410 may include a threshold component 422 for determining if a first disabling threshold of a maximum acceptable aggregate current has been reached. Optionally, the threshold component 422 may also determine whether a second re-enabling threshold has been reached below which the aggregate current must fall to re-enable the sockets. The overload prevention system 130 may include a user threshold configuration component 470 which may enable a user to configure the first and second thresholds to a required threshold level of amps or percentage of the capacity of the power distribution unit. There may be preset thresholds, which may be selected.

The excess power detector 410 may include a trigger component 424 for triggering a disabling mechanism actuator 440 for actuating the mechanical disabling mechanisms when a first threshold is reached and, optionally, for triggering a re-enabling mechanism actuator 450 for de-actuating the mechanical disabling mechanism if the second threshold is reached.

The disabling mechanism actuator 440 may include a shutter activation component 441 and a shutter de-activation component 442. In the embodiment shown in FIGS. 3A, 3B and 3C, a applying and stopping a current is required to de-activate and activate the rotating shutter 331. A current is required to the solenoid 340 to keep the actuator rod 342 in a retracted position and the earth pin slot 301 un-occluded by e shutter 331. Therefore, the shutter activation component 441 may act to stop the current to the solenoids 340 at each socket 151 thereby allowing the shutter 331 to be pushed by the actuator rod 342 to occlude the earth pin socket 301. The shutter de-activation component 442 may re-apply current to the solenoids 340 of the sockets 151 to retract the actuator rod 342 and rotate the shutter 331 to open the earth pin socket 301.

The shutter activation component 441 may act to stop the current to the solenoids 340 at each socket 151 including sockets 151 that are occupied by a plug. However, the earth pin present in the earth pin slot of the socket will prevent the shutter 331 from rotating and therefore the shutter activation component 441 will not have any effect on the occupied sockets.

The overload prevention system 130 may include a user override receiving component 430 for receiving a user input to override the disabling mechanism actuator 440 in response to an input by a user using the user input device 210 shown in FIG. 2. Overriding the disabling mechanism actuator 440 may operate the shutter de-activation component 442, if the shutter 331 is in its occluded position.

The overload prevention system 130 may also include a display 460 for displaying one or more of: the aggregate current, the thresholds at which the triggers are set, an indication that the disabling mechanism is actuated, and an indication that the disabling mechanism has been overridden.

If all the sockets in the power distribution unit are occupied and therefore cannot be mechanically disabled, the excess poser detector 410 may operate to provide an alert on the display 460 that a first threshold has been exceeded.

Figure 5A:
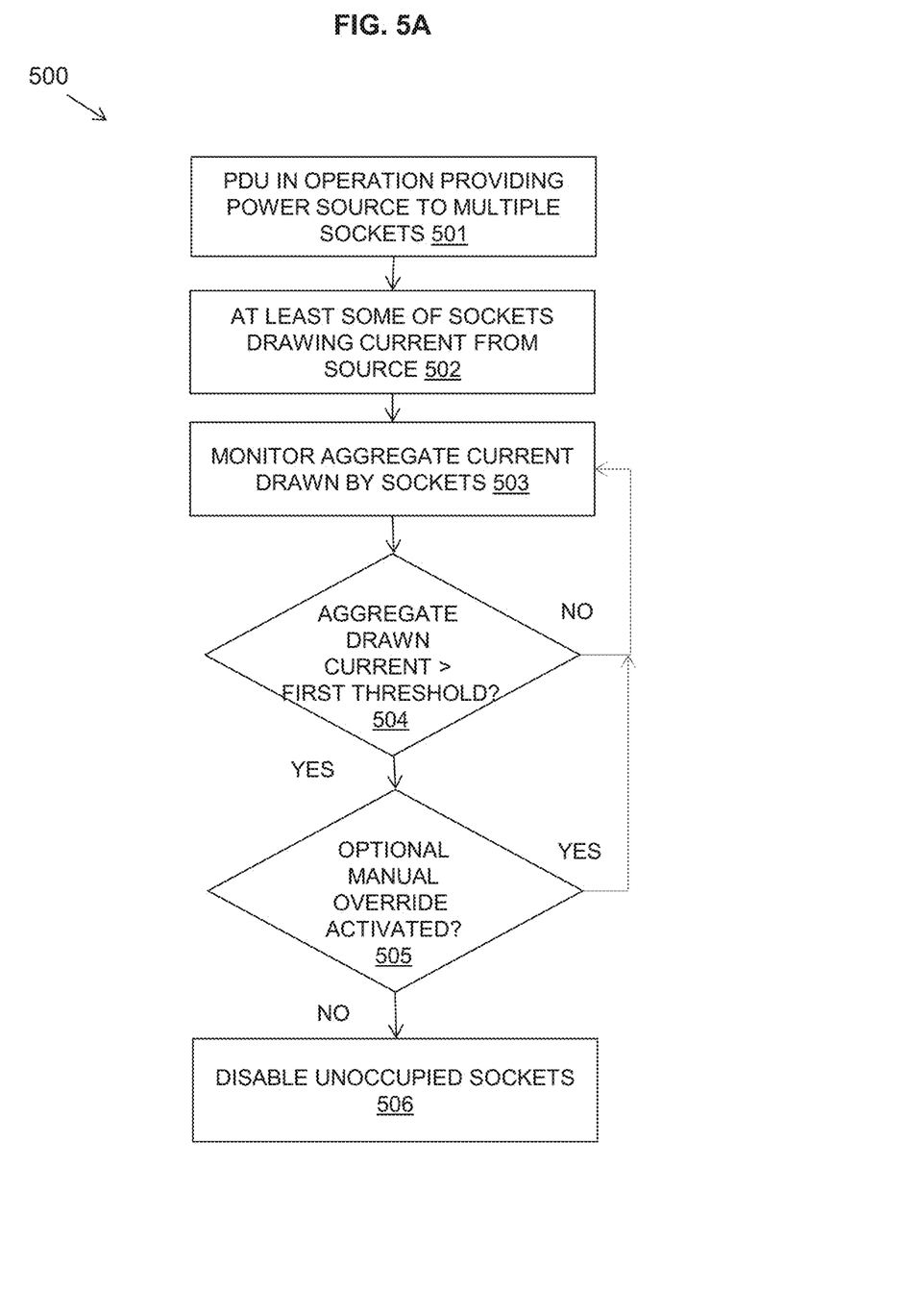
FIG. 5A is a flow diagram of an example embodiment of a first aspect of a method, in accordance with embodiments of the present invention.

FIG. 5A is a flow diagram of an example embodiment of a first aspect of a method, in accordance with embodiments of the present invention. More specifically, FIG. 5A is a flow diagram 500 that shows an example embodiment of a method as carried out by the power distribution unit 100, 150 with control by the control component 411.

A power distribution unit (PDU) may be in operation (step 501) providing a power source to multiple sockets. At least some of the sockets may be occupied by plugs and drawing (step 502) current from the source.

The method may monitor (step 503) the aggregate current drawn by the sockets. It may be determined (step 504) if the aggregate drawn current is greater than a first threshold. In one embodiment, the first threshold may be set at approximately 95% of the rated loading of the power distribution unit; however, a threshold in the range of 90% to 97% may be provided in another embodiment.

Thresholds of other ranges may be provided depending on how the socket is used and this may be configurable by a user. In data center applications, it may be appropriate for the first threshold to be configured for a particular power distribution unit depending on the use and types of devices served by the unit.

For example, if it is known that there are four of power distribution units in the form of multi-socket devices on a 32 Amp ring, setting the limit for each multi-socket device to be 8 Amp instead of 13 Amp might be preferable. Therefore the threshold may be lower at, for example, approximately 60%.

If it is determined from step 504 that the first threshold has not been exceeded, the method may loop to continue to monitor (step 503) the aggregate current. If it is determined from step 504 that the first threshold has been exceeded, it may optionally be determined (step 505) if a manual override has been activated. A manual override may be activated if a user is confident that a subsequently added or switched on plug will not compromise the capacity of the power distribution unit. Such a manual override may not be provided or allowed in environments where the override runs an unacceptable risk.

If it is determined from step 505 that a manual override has been activated the method may loop to continue to monitor (step 503) the aggregate current. An additional safety threshold may be provided at a higher percentage, for example 99% of the rated loading for disabling the remaining sockets, if appropriate.

If it is not determined from step 505 that a manual override has been activated or if the manual override is not allowed, the method may disable (step 506) one or more sockets of the unoccupied sockets. In one embodiment, all of the unoccupied sockets are disabled in step 506. In one embodiment, all but one of the unoccupied sockets are disabled in step 506. In one embodiment, one or some, but not all, of the unoccupied sockets are disabled in step 506.

Figure 5B:
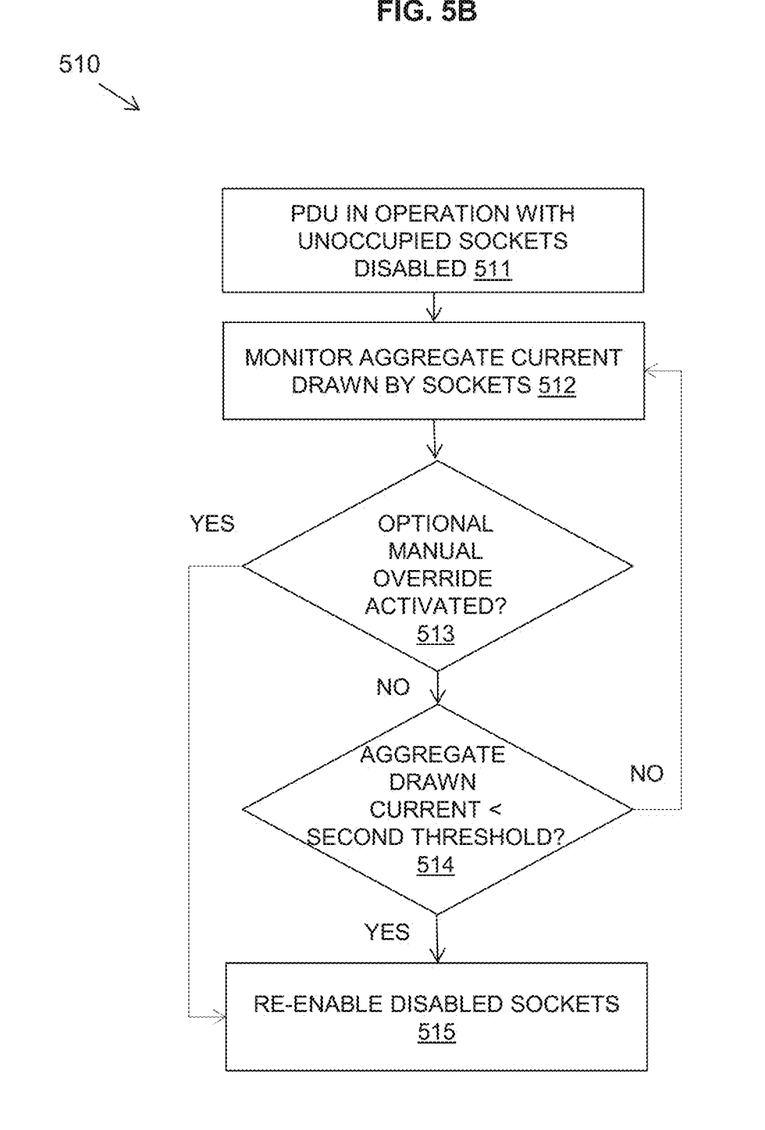
FIG. 5B is a flow diagram of an example embodiment of a second aspect of a method, in accordance with embodiments of the present invention.

FIG. 5B is a flow diagram of an example embodiment of a second aspect of a method in accordance with embodiments of the present invention. More specifically, FIG. 5B, is a flow diagram 510 that shows an example embodiment of a further aspect of a method as carried out by power distribution unit 100, 150 with control by the control component 411.

A power distribution unit may be in operation (step 511) providing a power source to multiple sockets with unoccupied sockets disabled.

The method may monitor (step 512) the aggregate current drawn by the active sockets.

It may be determined if a manual override is activated (step 513) by a user. If step 513 determines that a manual override is activated, the control system may re-enable (step 515) the disabled sockets.

If step 513 determines that a manual override has not been activated, it may be determined (step 514) if the aggregate drawn current is less than a second threshold. In one embodiment, the second threshold is less than the first threshold. The second threshold may be set at a percentage of the rated loading of the distribution unit at which it is considered safe to add another active socket to draw current. For example, this may be based on a ratio of the number of disabled sockets to the total number of sockets in the power distribution unit, or based on an average current drawing of a socket. A suitable range for the second threshold may be, for example, 50% to 70%. Again, this threshold may be configured by a user depending on the situation in which the power distribution unit is being used.

If it is determined from step 514 that the aggregate current is not below the second threshold, the method may loop to continue to monitor (step 512) the aggregate current. If it is determined from step 514 that the aggregate current is below the second threshold, the method may re-enable (step 515) the unoccupied sockets.

Optionally, there may be a further manual override to prevent re-enabling the disabled sockets, if a user or supervisor wishes to keep the remaining sockets disabled, for example, the supervisor may know that an increase in current from one of the existing appliances is imminent.

The described power distribution unit prevents the ability of unknowingly creating a risk of overloading. Utilizing existing technologies such as metering the power draw of appliances, a threshold is set of the rated loading of the distribution unit.

While it is common to have circuit breakers or fuses, those are logical Boolean trips, not physical as in the described power distribution unit. The described power distribution unit safeguards against complacent or accidental human intervention to circumvent.

Figure 6:
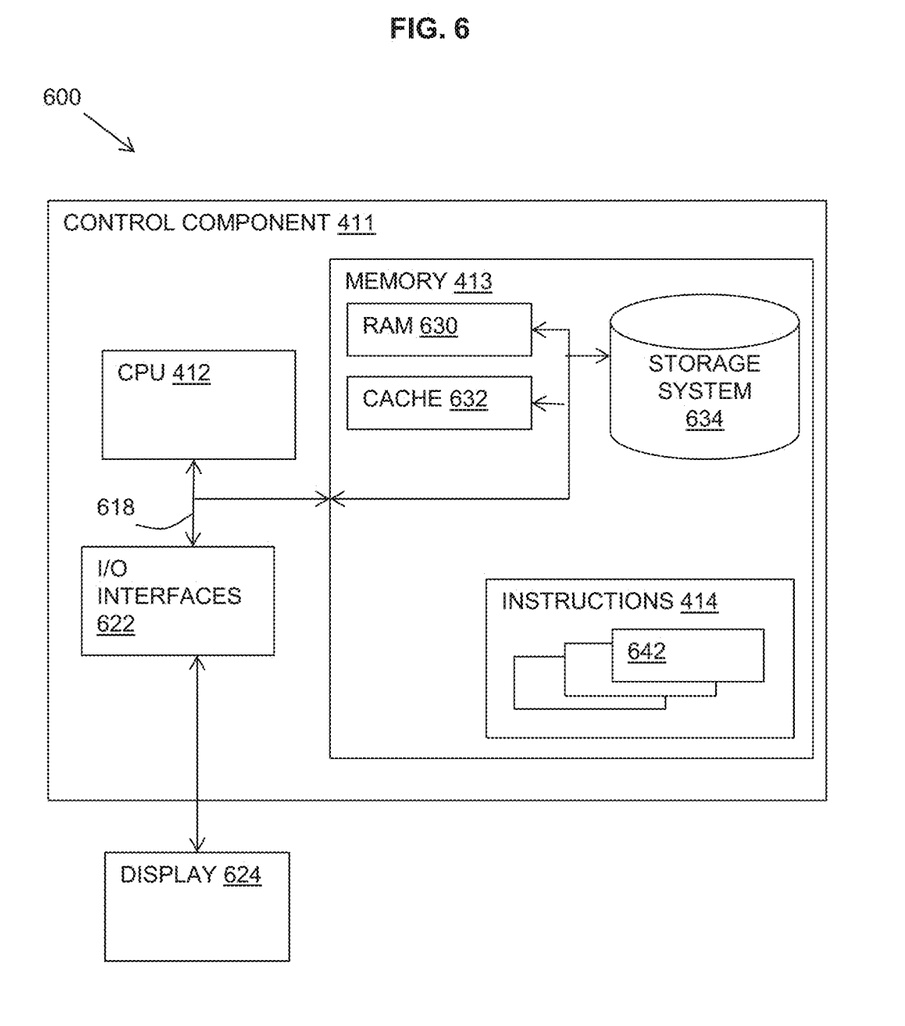
FIG. 6 is a block diagram of an embodiment of a computer system in which the present invention may be implemented.

FIG. 6 is a block diagram of an embodiment of a computer system 600 in which the present invention may be implemented. In FIG. 6, a schematic of an example of the control component 411 of FIG. 4 is shown.

The control component 411 may be described in the general context of computer system executable instructions, such as program modules, being executed by a computer system. Generally, program modules may include routines, programs, objects, components, logic, data structures, and so on that perform particular tasks or implement particular abstract data types.

The components of the control component 411 may include, but are not limited to, one or more central processing units (CPUs) 412, a system memory 413, and a bus 618 that couples various system components including system memory 413 to the CPU 412.

Bus 618 represents one or more of any of several types of bus structures, including a memory bus or memory controller.

System memory 413 can include computer system readable media in the form of volatile memory, such as random access memory (RAM) 630 and/or cache memory 632. As will be further depicted and described below, memory 413 may include at least one program product or instruction 414 having a set (e.g., at least one) of program modules 642 that are configured to carry out the functions of embodiments of the invention.

System memory 413 includes a non-volatile storage system 634 which may include one or more computer readable hardware storage devices; e.g., an electronic storage device, a magnetic storage device, an optical storage device, an electromagnetic storage device, a semiconductor storage device, or any suitable combination of the foregoing.

Computer system 612 may also communicate with one or more external inputs and outputs including an output display 624. Such communication can occur via Input/Output (I/O) interfaces 622.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD) a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing, device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer nay be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. An electrical power distribution unit for overload prevention, comprising:
    a plurality of sockets, each socket being an electrical power outlet socket, each socket having a plurality of slots for receiving corresponding pins of a power plug comprising two main pins and an earth pin, said plurality of slots of each socket comprising two main pin slots for receiving the two main pins of the respective power plug and an earth pin slot for receiving the earth pin of the respective power plug;
    a mechanical disabling mechanism configured to disable each socket that is unoccupied by a respective power plug; and
    an excess power detector configured to detect an aggregate power drawn from the sockets and configured to actuate the mechanical disabling mechanism for disabling each socket that is unoccupied by a power plug in response to a determination that the detected aggregate power exceeds a predetermined first threshold, wherein the mechanical disabling mechanism is configured to disable each socket that is unoccupied by the respective power plug by rotating an electrically actuable shutter to selectively occlude the earth pin slot and not occlude the two main pin slots of each socket that is unoccupied by the respective power plug.

2. The electrical power distribution unit of claim 1, wherein the electrically actuable shutter is actuated by a solenoid having a solenoid coil to which current is selectively applied and a solenoid actuator rod attached to the shutter, wherein the shutter is rotatable to occlude the earth pin slot in response to a lateral movement of the actuator rod caused by the solenoid coil changing from an energized state to an un-energized state.

3. The electrical power distribution unit of claim 2, wherein the electrically actable shutter is a rotatable shutter shaped to rotate in response to a lateral force applied by the solenoid actuator rod.

4. The unit of claim 2, wherein the mechanical disabling mechanism includes a compression spring configured to bias the solenoid actuator rod to the lateral movement caused by the solenoid coil changing from the energized state to the un-energized state.

5. The electrical power distribution unit of claim 2, wherein the excess power detector is configured to de-actuate the mechanical disabling mechanism by re-energizing the solenoid coil causing the actuator rod to retract and rotate the shutter to open the at least one of the receptacles.

6. The electrical power distribution unit of claim 1, including a user input device for overriding the excess power detector to prevent actuation of the mechanical disabling mechanism or to de-actuate the mechanical disabling mechanism.

7. The electrical power distribution unit of claim 1, wherein the excess power detector includes a current monitoring component for monitoring the detected aggregate power drawn from the sockets and a threshold component for determining if the detected aggregate power exceeds the predetermined first threshold.

8. The electrical power distribution unit of claim 7, wherein the threshold component includes a predetermined second threshold, wherein, in response to the detected aggregate power being below the predetermined second threshold, the electrical power distribution unit de-actuates the mechanical disabling mechanism, and wherein the second threshold is below the first threshold.

9. The electrical power distribution unit of claim 7, wherein the threshold component is configurable by a user depending on circumstances of use of the power distribution unit.

10. The electrical power distribution unit of claim 1, wherein the excess power detector includes a control component having a processor and a memory configured to provide computer program instructions to the processor to execute a triggering component for triggering the mechanical disabling mechanism in response to a determination by the control component that the first threshold has been exceeded.

11. The electrical power distribution unit of claim 10, including a user override receiving component for receiving a user input to override the control component.

12. The electrical power distribution unit of claim 11, wherein the user override receiving component prevents the triggering of the mechanical disabling mechanism or, if the unoccupied sockets are already disabled, de-actuates the mechanical disabling mechanism.

13. The electrical power distribution unit of claim 1, wherein the power distribution unit is selected from the group consisting of a domestic adapter for connection to a mains supply, an industrial adapter for connection to an industrial power supply, and a distribution unit for a data center with a commercial power supply.

14. The electrical power distribution unit of claim 1, wherein the excess power detector for detecting the aggregate power drawn from the sockets is an ammeter suitable for alternating or direct current measurement.

15. The electrical power distribution unit of claim 1, wherein the first threshold is configured as a percentage of the rated loading of the power distribution unit or the first threshold is configured as a maximum loading for specified appliances being powered by the power distribution unit.

16. A method for preventing overload of an electrical power distribution unit, said electrical power distribution unit comprising: (i) a plurality of sockets, each socket being an electrical power outlet socket, each socket having a plurality of slots for receiving corresponding pins of a power plug; (ii) a mechanical disabling mechanism configured to disable each socket that is unoccupied by a respective power plug comprising two main pins and an earth pin, said plurality of slots of each socket comprising two main pin slots for receiving the two main pins of the respective power plug and an earth pin slot for receiving the earth pin of the respective power plug; and (iii) an excess power detector configured to detect an aggregate power drawn from the sockets, said method comprising:
monitoring, by the excess power detector, a first aggregate power drawn from the sockets; and
determining that the first aggregate power exceeds a predetermined first threshold and in response, actuating the mechanical disabling mechanism to disable each socket that is unoccupied by the respective power plug by rotating an electrically actuable shutter to selectively occlude the earth pin slot and not occlude the two main pin slots of each socket that is unoccupied by the respective power plug.

17. The method of claim 16, said method further comprising:
monitoring, by the excess power detector, a second aggregate power drawn from the sockets while the mechanical disabling mechanism is actuated;
determining that the second aggregate power is less than a predetermined second threshold and in response, de-actuating the mechanical disabling mechanism to re-enable the disabled sockets, wherein the predetermined second threshold is less than the predetermined first threshold.

18. The method as claimed in claim 16, said method further comprising:
receiving a user input to override the actuating of the disabling mechanism or to de-actuate the mechanical disabling mechanism.

19. A computer program product, comprising a computer readable hardware storage device having computer readable program instructions stored therein, said hardware storage device not being a signal, said program instructions being executable by a processor to implement a method for preventing overload of an electrical power distribution unit, said electrical power distribution unit comprising: (i) a plurality of sockets, each socket being an electrical power outlet socket, each socket having a plurality of slots for receiving corresponding pins of a power plug; (ii) a mechanical disabling mechanism configured to disable each socket that is unoccupied by a respective power plug comprising two main pins and an earth pin, said plurality of slots of each socket comprising two main pin slots for receiving the two main pins of the respective power plug and an earth pin slot for receiving the earth pin of the respective power plug; and (iii) an excess power detector configured to detect an aggregate power drawn from the sockets, said method comprising:
monitoring, by the excess power detector, a first aggregate power drawn from the sockets, and
determining that the first aggregate power exceeds a predetermined first threshold and in response, actuating the mechanical disabling mechanism to disable each socket that is unoccupied by the respective power plug by rotating an electrically actuable shutter to selectively occlude the earth pin slot and not occlude the two main pin slots of each socket that is unoccupied by the respective power plug.

* * * * *